Aug. 16, 1932.  W. RICHTER  1,872,008
ELECTRIC ARC WELDING
Filed April 19, 1929

INVENTOR.
Walther Richter
BY
ATTORNEY.

Patented Aug. 16, 1932

1,872,008

UNITED STATES PATENT OFFICE

WALTHER RICHTER, OF MILWAUKEE, WISCONSIN, ASSIGNOR TO A. O. SMITH CORPORATION, OF MILWAUKEE, WISCONSIN, A CORPORATION OF NEW YORK

ELECTRIC ARC WELDING

Application filed April 19, 1929. Serial No. 356,574.

This invention relates to electric arc welding and more particularly to the arrangement of the ground terminal for connecting the metal to be welded to the source of welding energy.

Where two parts are being welded together, it is advisable to employ two ground terminals, one on each part, and to place them symmetrically or at predetermined positions with respect to the welding arc so that each will theoretically carry equal or predetermined parts of the welding current. These terminals may be movable with the arc so as to maintain such predetermined relative position with respect thereto. The difficulty of maintaining an equal electric contact between the terminals and the parts being welded results in practice in unequal resistance of the parallel ground circuits irrespective of the symmetrical or non-symmetrical arrangement thereof, which difference in resistance tends to alter the effect intended from the predetermined position of the grounds. Where movable ground terminals are employed, this contact resistance may vary as the grounds move relatively over the parts being welded.

In the welding of a longitudinal seam in a tubular article where the edges to be welded are on a single integral piece of metal, difficulties arise in maintaining an equal or predetermined distribution of the welding current to the said edges.

The object of the present invention is to overcome the above difficulties in practice and to obtain a more equal or predetermined distribution of the welding current in the parts being welded.

The accompanying drawing illustrates an embodiment of the invention and the views therein are as follows.

Figure 1:
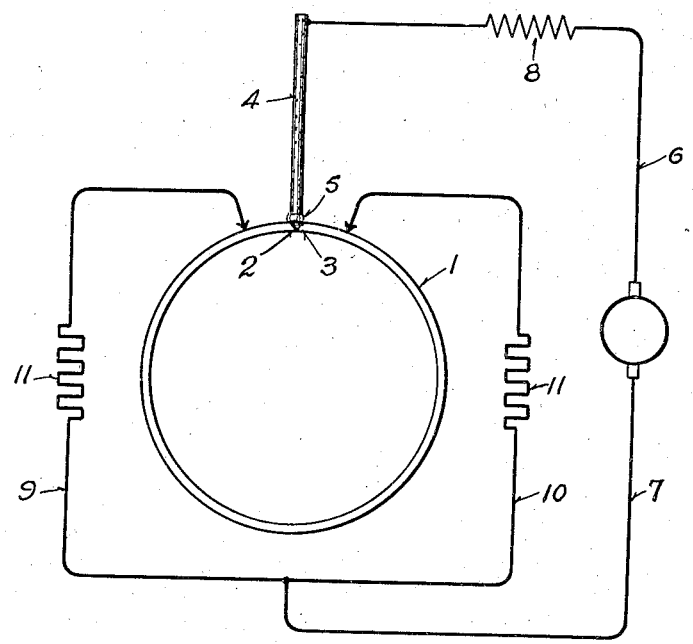
Figure 1 is a diagrammatic illustration of the apparatus in end elevation.

The tubular blank 1 may be formed in any suitable manner and has longitudinal meeting edges 2 and 3 forming a longitudinal seam to be welded. A welding electrode 4 which may be of any suitable material for welding is employed and an electric arc 5 is established between the electrode and the edges 2 and 3 to be welded. The electrode 4 and the blank 1 are connected by leads 6 and 7 respectively to opposite terminals of a suitable source of welding current. The lead 6 may have any suitable ballast resistances 8 arranged therein. The lead 7 is preferably split into two or more parallel branches 9 and 10 which form the ground terminals for the blank and which split the welding current into parallel ground circuits.

Figure 2:
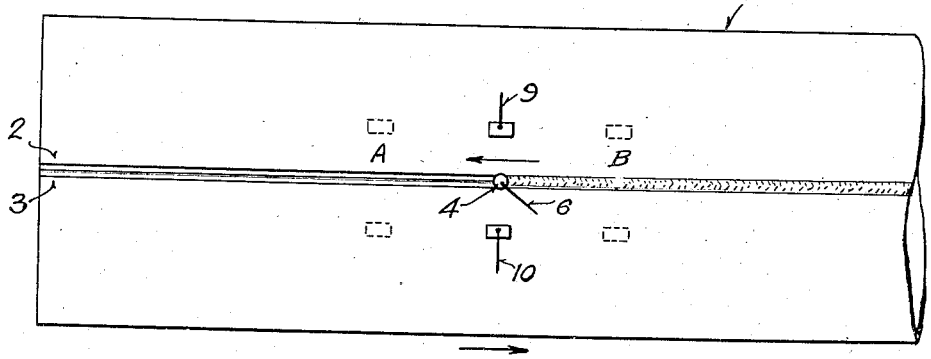
Figure 2 is a similar illustration in plan.

These ground terminals are preferably arranged symmetrical with respect to the arc and to the edges being welded and may be fixed during the welding operation or may move with the arc relative to the article being welded. They are preferably arranged equi-distant from the arc and from the edges to be welded and are either arranged on opposite sides of the arc, as shown in Fig. 2, or both forward thereto, as shown by the dotted lines at A in Fig. 2, or in the rear thereof, as shown by the dotted lines at B in Fig. 2. However, other symmetrical arrangements of the terminals may be employed or the ground terminals may purposely be arranged at different distances from the arc or from the seam being welded.

In order to prevent the uncertainties and inequalities in the resistance of the electrical contact points of the respective terminals with the metal to be welded from affecting the proportion of current to be carried by the respective ground circuits, each of said circuits is provided with a substantially high resistance element 11. These resistance elements are preferably equal and are higher than any resistance of the contact points of the respective ground terminals. By reason of this added resistance in the branch ground circuits, the total resistances of these circuits are maintained substantially equal regardless of fluctuations in the resistance of the contact points of the respective ground terminals. By such arrangement, it is possible to obtain an equal distribution of the welding current to these circuits and consequently to the edges 2 and 3 to be welded. Where an unequal distribution of the welding current is desirable, the resistances 11 may be made proportionately unequal and may be varied as desired.

By employing a plurality of ground leads and placing the same symmetrical with respect to the arc, a more uniform and stable arc is obtained for welding and the distribution of the heat of the arc to the metal to be welded is controlled.

In the welding of tubular blanks, such as the one illustrated, it is preferable to have the grounds on opposite sides of the blank and equidistant from the arc since this arrangement sets up a minimum of detrimental magnetic flux in the pipe and provides for a more uniform distribution of the heat of the arc to the respective edges being welded.

The resistances 11 need not place any added load on the welding current since that constitutes a ballast for the same, thus relieving at least part of the ballast resistances 8 which are generally employed in the lead 6. The total resistance of the welding circuit therefore need not be increased.

While the invention has been applied to the welding of metal parts together, it is not to be limited thereto, as the same may be applied wherever an electric arc is employed for heating or fusing metal.

I claim:

1. In an electric arc welding apparatus, an electrode arranged in arcing relation to the metal to be welded and connected to one terminal of a source of welding energy, and a plurality of ground leads of substantially high resistance connecting the metal to be welded to the other terminal of the source of welding energy and arranged on opposite sides of the seam to be welded to control the welding arc established between said electrode and the work.

2. In an electric arc welding apparatus for welding the longitudinal seams of tubular articles, an electrode arranged in arcing relation to the metal edges to be welded and connected to one terminal of a source of welding energy, and parallel ground leads of substantially high resistance connected to opposite sides of the tubular blank and to the other terminal of the source of welding energy.

3. In an electric arc welding apparatus for welding the longitudinal seams of tubular articles, an electrode arranged in arcing relation to the edges to be welded and connected to one terminal of a source of welding energy, parallel ground leads connected on opposite sides of the tubular blank and equi-distant from the welding arc, and equal resistance elements arranged in said parallel ground leads to effect an equal distribution of the welding current to the respective edges to be welded.

4. In an electric arc welding apparatus employing a single welding arc, a plurality of mobile parallel ground leads arranged on opposite sides of the welding arc and connecting the metal to be welded to one terminal of the welding energy, said ground leads being adapted to be moved relatively to the work as the arc moves along the work and being of substantially high resistance whereby changes in resistance of the contact of said leads with the work will not materially effect the distribution of welding current to said leads.

5. In an arc welding apparatus, a welding electrode arranged in arcing relation to the seam to be welded, and connected to one terminal of a source of welding current, a pair of ground leads wired in parallel in the welding circuit and connected to the other terminal of said source of welding current, ballast resistance units in each of said ground leads offering substantially the same relatively high resistance, said ground leads being arranged relative to the welding arc and on opposite sides of the seam to effect a balanced current distribution to the edges of the parts to be welded.

6. In an apparatus for performing electric arc welding operations on metal to be welded, in combination, a source of electrical energy for performing welding operations, an electrode connected to one pole of the source of electrical energy cooperative to draw an arc with the metal to be welded, a plurality of ground leads connected in parallel circuit relation to the other pole of the source of electrical energy, the ground leads being disposed to be moved into engagement with the metal to be welded and relative to one another to different positions on the metal to be welded, and resistors of high ohmic value connected in series circuit relation in the ground leads, the resistors of high ohmic value serving to render the variations in resistance in the ground leads caused by the different contacts made with the metal to be welded ineffective to materially disturb the predetermined distribution of the welding current in the ground leads.

7. In an apparatus for performing electric arc welding operations on metal to be welded, in combination, a source of electrical energy for performing welding operations, an electrode connected to one pole of the source of electrical energy cooperative to draw an arc with the metal to be welded, a plurality of ground leads connected in parallel circuit relation to the other pole of the source of electrical energy, the ground leads being disposed to be moved into engagement with the metal to be welded and relative to the metal to be welded to different relative distances from the arc, and resistors of high ohmic value connected in series circuit relation in the ground leads, the resistors of high ohmic value serving to render the variations in resistance in the ground leads caused by the different contacts made with the metal to be welded ineffective to materially disturb the predetermined distribution of the welding current in the ground leads.

In testimony whereof I have signed my name at Milwaukee, Wisconsin, this 16th day of April, 1929.

WALTHER RICHTER.